No. 12,271. REISSUED OCT. 4, 1904.

H. H. UCKOTTER.

SHAFT FOR VEHICLES.

APPLICATION FILED MAY 17, 1902.

Witnesses

Frederic G. Huntington

Carolyn Thile

Inventor

Herman H. Uckotter

By Attorneys

Parkinson + Richards

PHOTO-LITHOGRAPHED BY SACHETT & WILHELMS LITHO. & PTG. CO. NEW YORK.

No. 12,271. Reissued October 4, 1904.

UNITED STATES PATENT OFFICE.

HERMAN H. UCKOTTER, OF CINCINNATI, OHIO.

SHAFT FOR VEHICLES.

SPECIFICATION forming part of Reissued Letters Patent No. 12,271, dated October 4, 1904.

Original No. 649,969, dated May 22, 1900. Application for reissue filed May 17, 1902. Serial No. 107,869.

*To all whom it may concern:*

Be it known that I, HERMAN H. UCKOTTER, a citizen of the United States, and a resident of the city of Cincinnati, in the county of Hamilton and State of Ohio, have invented certain new and useful Improvements in Shafts, of which the following is a specification.

The several features of my invention and the various advantages resulting from their use conjointly or otherwise will be apparent from the following description and claims.

Figure 1:
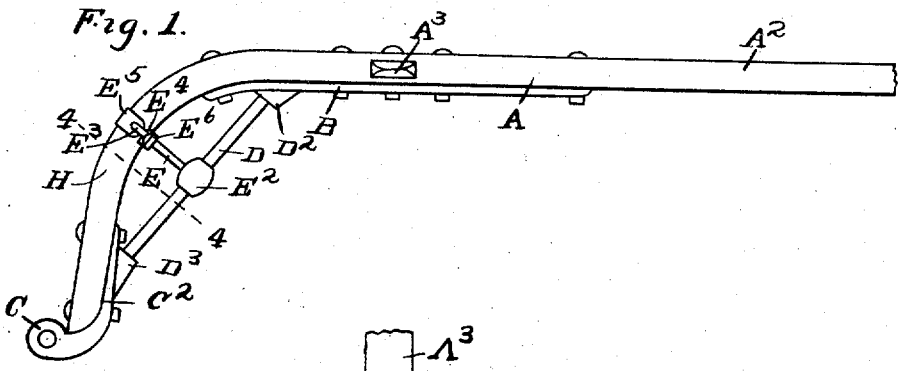
Figure 2:
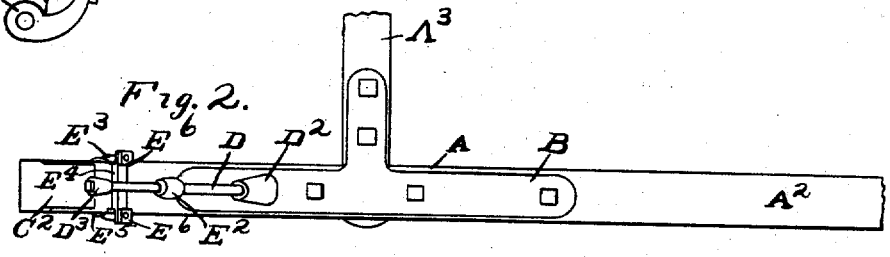
Figure 3:
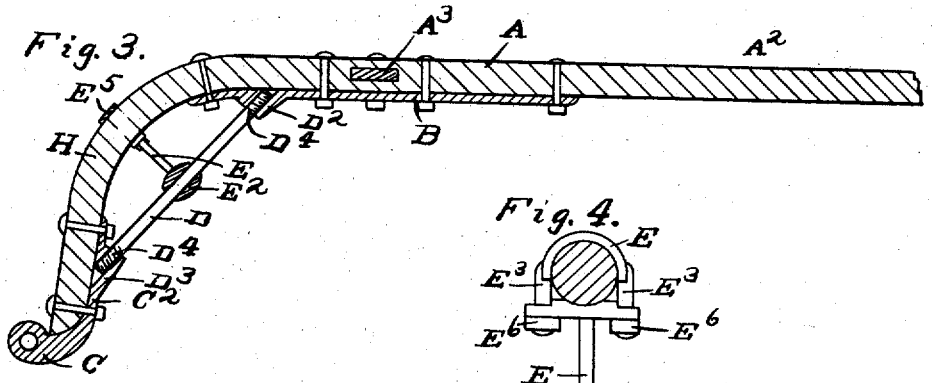
Figure 4:
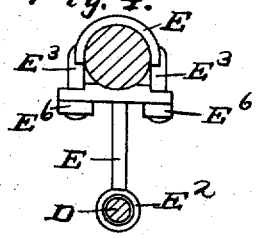

In the accompanying drawings, making a part of this application, and in which similar letters of reference indicate corresponding parts, Figure 1 represents a side elevation of a pair of shafts illustrating my invention. Fig. 2 is an under side view of the same. Fig. 3 is a sectional elevation lengthwise of the shaft, showing the double screw-threads. Fig. 4 represents a cross-section taken in the plane of the dotted line 4 4 of Fig. 1.

I will now proceed to describe my invention in detail.

A indicates the entire shaft structure.

$A^2$ $A^2$ indicate, respectively, the longitudinal shafts.

$A^3$ indicates the usual and well-known cross-bar.

B B indicate the usual T-plates, which respectively connect the adjacent shaft to the cross-bar.

C C indicate the customary shaft-eyes, each having the shank $C^2$, whereby the eye is securely bolted to the rear end of the shaft. Each shaft has the usual curve H at its rear portion.

My invention in general has for its object the bracing and strengthening of the shaft at and in the vicinity of the curve by bracing structures, which I will hereinafter describe.

Another object of my invention is to render the braces separable and adjustable. One of these braces consists of an iron (or other metal) rod D, extended across the space between the bend H of the shaft. The forward end of the rod D is received in a lug $D^2$, located on the plate B, and is formed in one with the latter, and the rear end of the rod D is received in a lug $D^3$, located on the shank of the shaft-eye, and is formed in one with the latter. Not only this, but the connection between the rod and each lug is a screw-threaded connection, the rod being provided at each end with a male screw-thread adapted to engage an interior screw-thread in the adjacent lug. The screw-threads on the rod are respectively right and left hand screws $D^4$, so that when the parts are united a rotation of the brace-rod D in one direction will serve to simultaneously draw both lugs $D^2$ $D^3$ toward each other and also, of course, the parts to which these lugs are respectively connected, thereby tightening the brace-rod in relation to its connections and stiffening the shaft at the bend. The rotation of the brace-rod D in a contrary direction will effectuate a loosening of the same parts. The bend H is further strengthened and the shaft strengthened and the brace-rod D stiffened by means of the following simple and very effective device:

I locate a cross-brace E between the brace-rod D and the central portion of the bend H of the shaft, and this brace is connected to the brace-rod D and the shaft substantially as follows: There is an eye or sleeve $E^2$ embracing the brace-rod D, and to this one end of this cross-brace E is connected by a screw or other connection. The other end of this brace is connected to a clip $E^3$—that is, to the clip-bar $E^4$—which latter, in conjuntion with a clip $E^5$, firmly embraces the shaft. The rods of the clip $E^5$ pass through the clip-bar $E^4$ and are secured in place by the usual screw-nuts $E^6$.

The brace-rod D is separable from the lugs $D^2$ and $D^3$, and the latter with their adjacent portions of the shaft structure are adjustable with reference to the brace-rod D, the latter being capable of being shortened or lengthened in relation thereto, also that the cross brace-rod E is separable from certain portions and adjustable in the direction of the length of the shaft.

It is to be observed that the lugs are specially formed, so that at one end they melt or disappear into the surface of the part (T-plate or shaft-eye shank) to which they are connected, thus not only saving metal, but presenting a much neater appearance to the eye.

The entire structure is very strong and can be kept as rigid as desired, and the parts can be kept not only rigid, but can be prevented from rattling.

When desired, the eyes C, instead of being as shown, may be what is known as "quick-detachable" ones. The conformation of the eye itself is not material to the present invention. The eye may be of any desired form or kind.

Having thus described my invention, what I claim as new, and desire to secure by Letters Patent of the United States, is—

1. In combination with the thill having a bent end the reinforce consisting of the thill-iron, the brace-plate, the brace-rod coupling the thill-iron and the brace-plate, and the cross-rod connecting the brace-rod and the shaft between the thill-iron and the brace-plate to strengthen and support the brace-rod, substantially as shown and described.

2. In combination with thill having a bent end the reinforce consisting of the thill-iron, the brace-plate, the brace-rod coupling said iron and said plate, the clip for embracing the thill, and the clip-bar with a downwardly-projecting boss perforated to receive the brace-rod, substantially as shown and described.

3. A reinforce for bent shafts or thills consisting of the thill-iron, the brace-plate, the brace-rod coupling said thill and plate and a cross-brace sleeved upon said rod and having a clip-bar upon its upper end to be connected to a clip to be secured to the curve of the shaft, substantially as shown and described.

4. In a pair of shafts, the combination of the shaft cross-bar, T-plate, shaft-eye shank, the lug $D^2$ of the T-plate, the lug $D^3$ of the shank-iron, the brace-rod D, connected to these lugs and the cross-brace E, having eye $E^2$, slidable on the brace-rod D, and clip-bar $E^4$, against the shaft, and the clip-piece, substantially as and for the purposes specified.

5. In a pair of shafts, the combination of the shaft cross-bar, T-plate, shaft-eye shank, the lug $D^2$ of the T-plate, the lug $D^3$ of the eye-shank, these lugs having interior screw-threads, and brace-rod D having end right and left hand screws, respectively connected to the screw-threads of these lugs, and adjustable thereby, cross brace-rod E, having eye $E^2$ slidable on the brace-rod D, and having clip-bar $E^4$, the latter with clip $E^5$ embracing the shaft, substantially as and for the purposes specified.

6. In a pair of shafts, the combination of the shaft cross-bar, T-plate, shaft-eye shank, the lug $D^2$ of the T-plate, the lug $D^3$ of the shank-iron, the brace-rod D, adjustably connected to these lugs and the cross-brace E, having eye $E^2$, slidable on the brace-rod D, and clip-bar $E^4$ against the shaft, and the clip-piece, connected to the brace-rod D and to the shaft at the bend or barrel thereof, substantially as and for the purposes specified.

HERMAN H. UCKOTTER.

Witnesses:
GEORGE B. PARKINSON,
BRAYTON G. RICHARDS.